US008739467B2

(12) United States Patent
Reno et al.

(10) Patent No.: US 8,739,467 B2
(45) Date of Patent: Jun. 3, 2014

(54) WINDOW REGULATOR GLASS ATTACHMENT GUIDE COVER

(75) Inventors: Christopher D. Reno, South Lyon, MI (US); Robert E. Ciborowski, Canton, MI (US); Mihaela Colfescu, Shelby Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/329,419

(22) Filed: Dec. 19, 2011

(65) Prior Publication Data

US 2013/0152476 A1 Jun. 20, 2013

(51) Int. Cl.
*B60J 1/16* (2006.01)
*E05F 11/38* (2006.01)

(52) U.S. Cl.
USPC .................................. 49/374; 49/348; 49/349

(58) Field of Classification Search
USPC ............................ 49/372, 374, 375, 348, 349
See application file for complete search history.

(56) References Cited

U.S. PATENT DOCUMENTS

| | | | | |
|---|---|---|---|---|
| 4,986,030 | A * | 1/1991 | Bertolini et al. | 49/351 |
| 5,363,595 | A * | 11/1994 | Wirsing | 49/375 |
| 5,546,704 | A * | 8/1996 | Maruoka | 49/375 |
| 5,692,273 | A * | 12/1997 | Rodde | 24/541 |
| 5,907,927 | A * | 6/1999 | Lieb et al. | 49/375 |
| 5,992,099 | A * | 11/1999 | Thomas | 49/375 |
| 6,119,403 | A * | 9/2000 | Klippert et al. | 49/375 |
| 6,330,764 | B1 * | 12/2001 | Klosterman | 49/375 |
| 6,425,207 | B1 * | 7/2002 | Davis | 49/375 |
| 6,453,617 | B1 * | 9/2002 | Klippert et al. | 49/375 |
| 6,854,213 | B2 | 2/2005 | Galliani | |
| 6,910,590 | B2 * | 6/2005 | Meier | 211/13.1 |
| 7,254,927 | B1 * | 8/2007 | Farrar et al. | 52/741.3 |
| 7,409,797 | B2 * | 8/2008 | Pound et al. | 49/375 |
| 7,430,831 | B2 * | 10/2008 | Castellon | 49/375 |
| 7,596,908 | B2 * | 10/2009 | Rothe et al. | 49/374 |
| 7,721,487 | B2 | 5/2010 | Costigan et al. | |
| 8,096,080 | B2 * | 1/2012 | Pavlovic et al. | 49/348 |
| 8,132,368 | B2 * | 3/2012 | Mangold et al. | 49/375 |
| 8,146,293 | B2 * | 4/2012 | Brownlie et al. | 49/375 |
| 2006/0130407 | A1 * | 6/2006 | Castellon | 49/375 |
| 2007/0006533 | A1 * | 1/2007 | Dedrich et al. | 49/375 |

FOREIGN PATENT DOCUMENTS

| | | | |
|---|---|---|---|
| DE | 3108244 | A1 | 6/1982 |
| DE | 3817260 | A1 | 11/1989 |
| DE | 4218425 | A1 | 12/1993 |
| EP | 173091 | | 3/1986 |
| EP | 0208237 | B1 | 1/1987 |
| JP | 06135228 | | 5/1994 |

* cited by examiner

*Primary Examiner* — Katherine Mitchell
*Assistant Examiner* — Shiref Mekhaeil
(74) *Attorney, Agent, or Firm* — Ralph E. Smith

(57) ABSTRACT

A guide cover that guides attachment of a window pane to a mounting bracket includes a body operable to removably attach to a first portion of the mounting bracket to position the body in an attached position relative to the mounting bracket. The body, the mounting bracket, and the window pane are operable to be moved as a unit by the regulator assembly with the body in the attached position. Moreover, the guide cover includes a guide surface included on the body. The guide surface and the second portion of the mounting bracket define an opening into a channel when the body is in the attached position. The guide surface is operable to guide the window pane through the opening into the channel.

11 Claims, 4 Drawing Sheets

WINDOW REGULATOR GLASS ATTACHMENT GUIDE COVER

FIELD

The present invention relates to a vehicle window regulator and, more particularly, to a window regulator glass attachment guide cover.

BACKGROUND

Vehicle doors often include a window pane that can move up and down within the door frame via a window regulator assembly. These assemblies typically include an actuator as well as mounting hardware (e.g., slider brackets) that support the window pane. To assemble the vehicle door, the window pane is typically attached to the mounting hardware. For instance, the mounting hardware can be one or more slider brackets, each having a channel, and the window pane is moved into the channel(s) of the slider brackets during assembly. Once assembled, the actuator can move the slider brackets and, thus, the window pane up and down within the door frame.

SUMMARY

A guide cover that guides attachment of a window pane to a mounting bracket of a regulator assembly of a door assembly is disclosed. The mounting bracket includes a first portion and a second portion. A channel is defined between the first and second portions. The guide cover includes a body operable to removably attach to the first portion of the mounting bracket to position the body in an attached position relative to the mounting bracket. The body, the mounting bracket, and the window pane are operable to be moved as a unit by the regulator assembly with the body in the attached position. Moreover, the guide cover includes a guide surface included on the body. The guide surface and the second portion of the mounting bracket define an opening into the channel when the body is in the attached position. The guide surface is operable to guide the window pane through the opening into the channel.

Moreover, a regulator assembly for actuating a window pane of a vehicle is disclosed. The regulator assembly includes an actuator and a mounting bracket. The mounting bracket includes a first portion and a second portion, and a channel is defined between the first and second portions. The channel is operable to receive the window pane. Moreover, the regulator assembly includes a guide cover having a body operable to removably attach to the first portion of the mounting bracket to position the body in an attached position relative to the mounting bracket. The body, the mounting bracket, and the window pane are operable to be moved as a unit by the actuator when the body is in the attached position. The body includes a guide surface, and the guide surface and the second portion of the mounting bracket define an opening into the channel when the body is in the attached position. The guide surface is operable to guide the window pane through the opening into the channel.

Further areas of applicability of the present disclosure will become apparent from the detailed description and claims provided hereinafter. It should be understood that the detailed description and specific examples, while indicating embodiments of the present disclosure, are intended for purposes of illustration only and are not intended to limit the scope of the present disclosure.

DETAILED DESCRIPTION

Figure 1A:
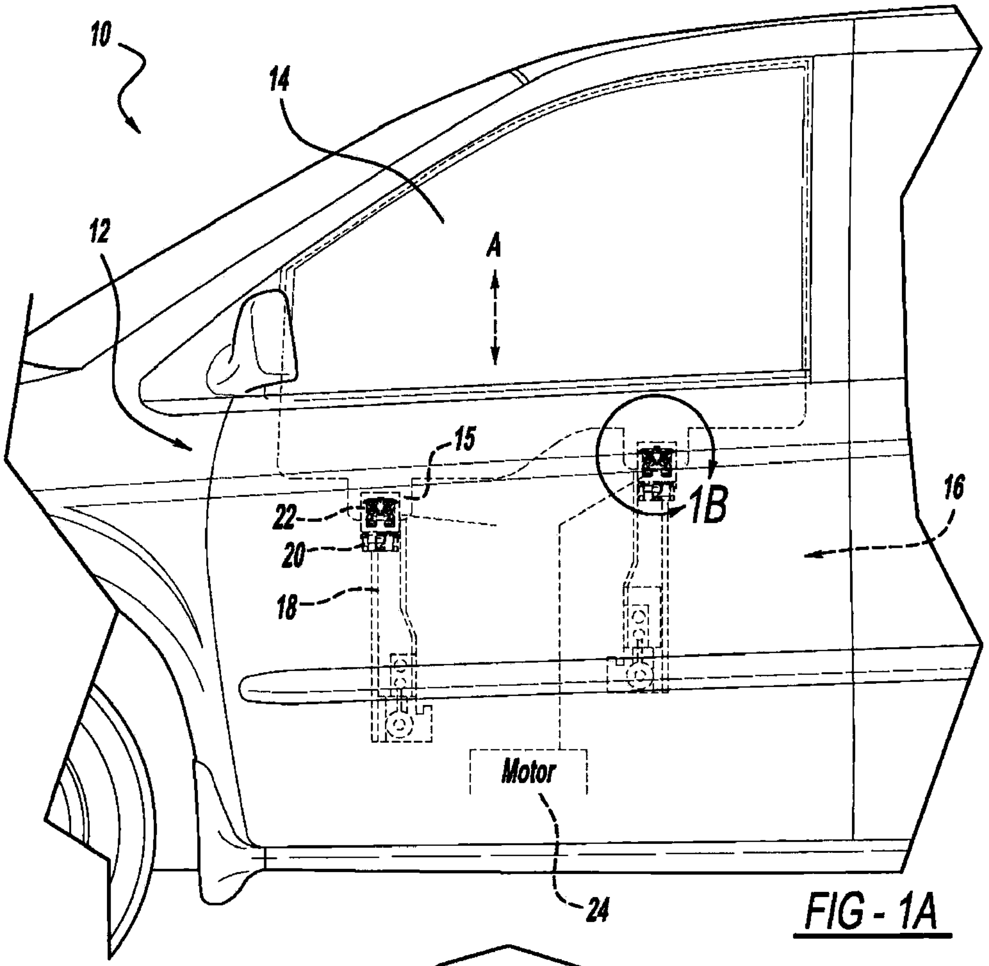
FIG. 1A is a side view of a vehicle door assembly with a regulator assembly of the present disclosure.
Figure 1B:
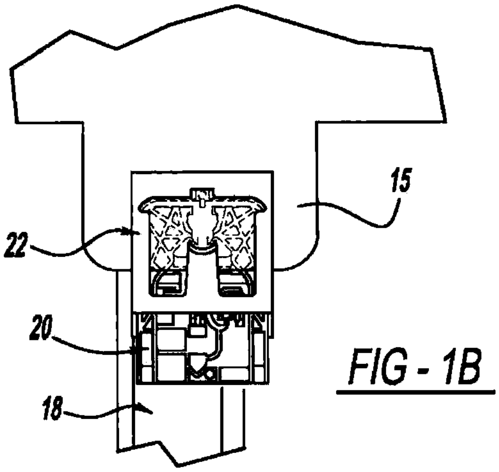
FIG. 1B is a detail view of the vehicle door assembly of FIG. 1A.

Referring initially to FIGS. 1A and 1B, a vehicle door 10 is illustrated according to various exemplary embodiments of the present disclosure. The vehicle door 10 can be a door of a car, truck, van, or any other type of vehicle. Also, the door 10 could be suitable for the passenger side or driver side of the vehicle, or the door 10 could be a rear door or gate of the vehicle.

The door 10 can generally include a door frame 12 and a window pane 14 of a known type. Also, the window pane 14 can include one or more (e.g., two) base flanges 15 on the lower, horizontal edge thereof. The door 10 can additionally include a regulator assembly 16 that actuates the window pane 14 relative to the door frame 12. For instance, the regulator assembly 16 can automatically actuate the window pane 14 up and down relative to the door frame 12 as indicated by arrow A in FIG. 1A. Alternatively, the regulator assembly 16 can be suitable for actuating the window pane 14 manually (e.g., by a manually-powered window crank). Thus, the regulator assembly 16 can be useful for opening and closing the window pane 14.

In some embodiments, the regulator assembly 16 can include one or more (e.g., two) slider rails 18 that are disposed within and that extend vertically within the door frame 12. The regulator assembly 16 can additionally include one or more (e.g., two) mounting brackets 20 (slider brackets). Furthermore, the regulator assembly 16 can include an actuator 24. For instance, the actuator 24 can be an electric or other type of motor or other type of known actuator that is operatively connected to the mounting brackets 20.

As will be discussed, the mounting brackets 20 can be moveably (e.g., slideably) attached to the slider rails 18. Also, the actuator 24 can actuate the brackets 20 such that the mounting brackets 20 move (e.g., slide) in concert along the longitudinal axis of the rails 18. The mounting brackets 20 can also operatively support the window pane 14 in a manner to be discussed. Thus, by moving the mounting brackets 20, the window pane 14 can be actuated relative to the door frame 12.

The regulator assembly 16 can additionally include one or more (e.g., two) guide covers 22. The guide covers 22 can each be operatively supported on a respective mounting bracket 20. When attached to the respective mounting bracket 20 (i.e., in the attached position), each guide cover 22 moves as a unit with the respective mounting bracket 20 and window pane 14 via the actuator 24. As will be discussed, the guide covers 22 can facilitate attachment of the window pane 14 to the mounting brackets 20 during manufacture of the vehicle door 10.

Figure 2A:
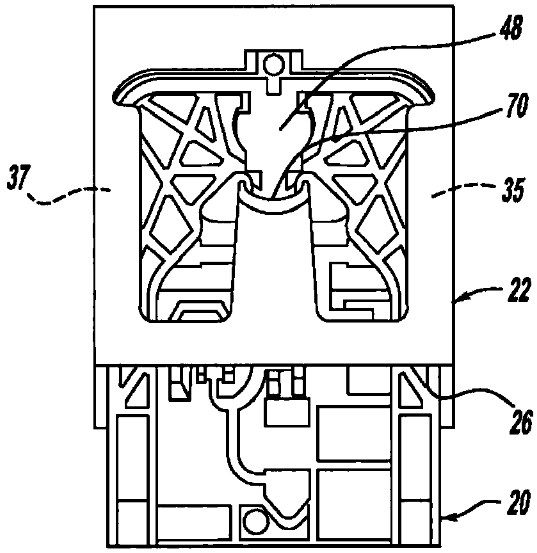
FIGS. 2A, 2B, and 2C are inboard, side, and outboard views, respectively, of a mounting bracket and a guide cover of the regulator assembly of FIG. 1A.
Figure 2B:
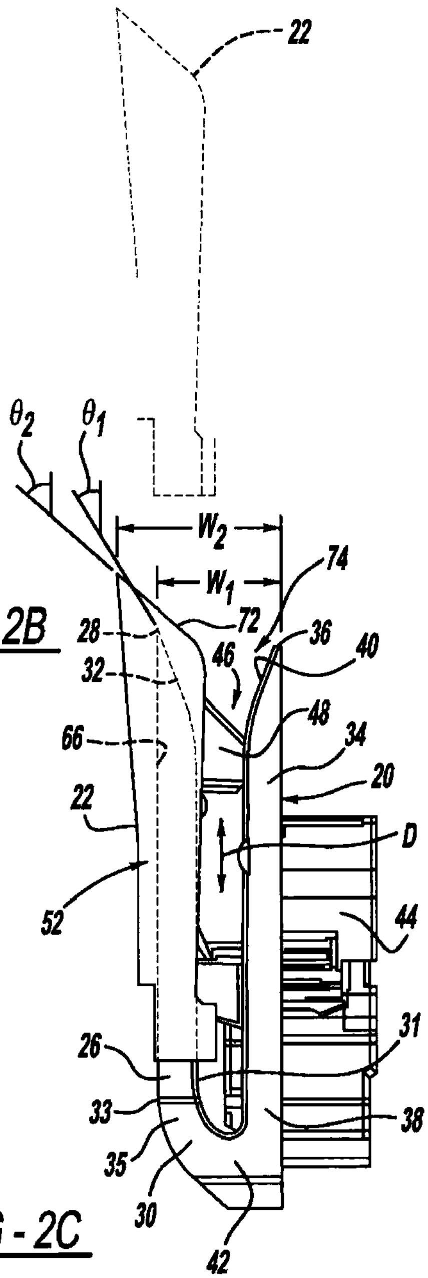
Figure 2C:
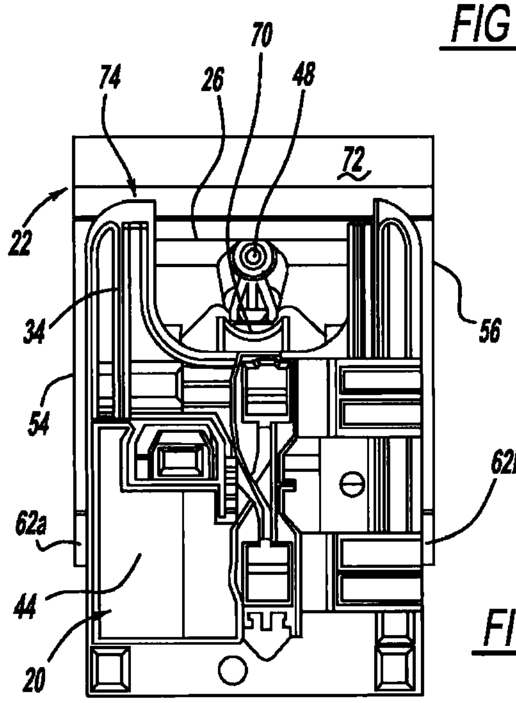

Referring now to FIGS. 2A-2C, the mounting bracket 20 will be discussed in greater detail. Although only one mounting bracket 20 is shown, it will be appreciated that all mounting brackets 20 of the vehicle door 10 can be substantially similar.

The mounting bracket 20 can be a monolithic, integrally connected part. The mounting bracket 20 can also be made out of any suitable material, such as a polymeric material.

As shown in FIG. 2B, the mounting bracket 20 can include a first (outboard) portion 26 and a second (inboard) portion 34 that each extend upwardly from opposite sides of a base 42. (The first portion 26 is shown partially in phantom in FIG. 2B because it is covered by the guide cover 22.) The first portion 26 can include a first end 28 (i.e., a terminal end or free end) and a second end 30 that is fixed to the base 42. The first end 28 can include an end surface 32. Also, the first portion 26 can include an inner surface 31 and an outer surface 33 that face in opposite directions. Still further, the first portion 26 can include a first side surface 35 and a second side surface 37.

The second portion 34 of the mounting bracket 20 can generally correspond in shape to the first portion 34. Thus, the second portion 34 can include a first end 36 and a second end 38 that is fixed to the base 42. The first end 36 can include an end surface 40.

Figure 4:
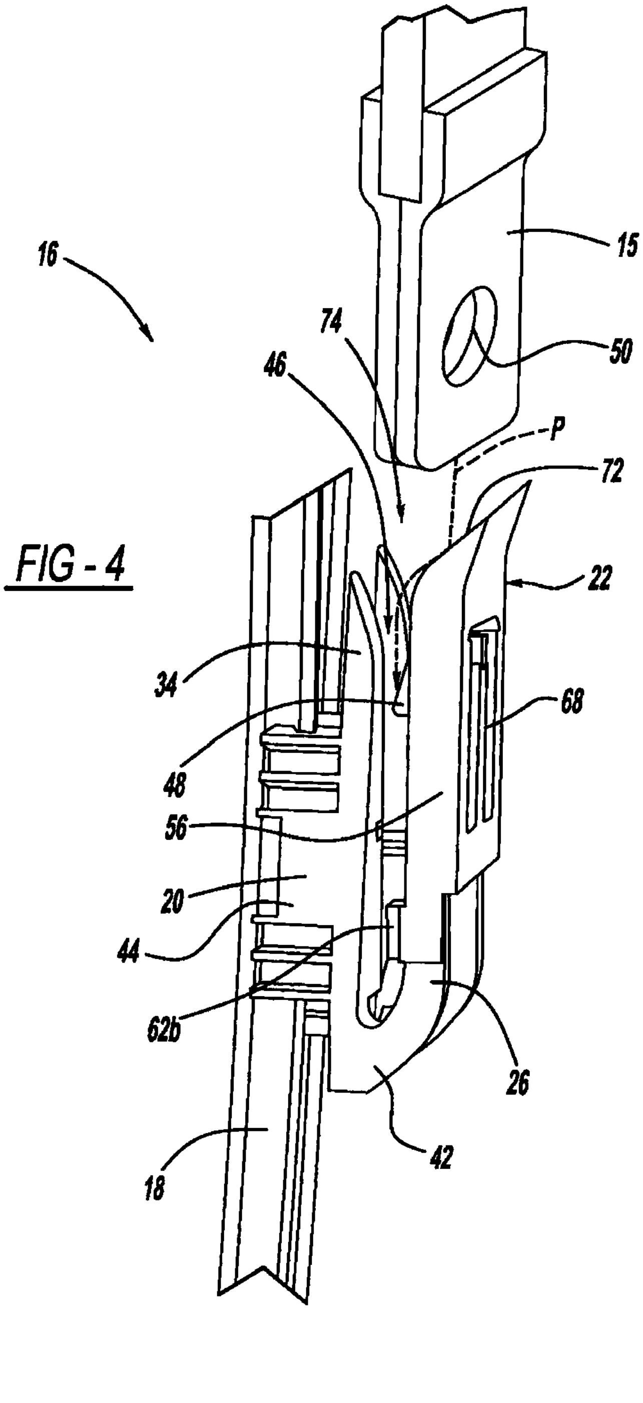
FIG. 4 is a side, rearward view of the regulator assembly of FIG. 1A, wherein a window pane is shown being guided by the guide covers toward engagement with the mounting brackets according to various exemplary embodiments of the present disclosure.

Still further, the mounting bracket 20 can include a slide coupling member 44, which is fixed to the outer surface of the second portion 34. The mounting bracket 20 can also be moveably (slideably) attached to the slider rail 18. As shown in FIG. 4, the slide coupling member 44 can include one or more grooves that receive a respective edge of the slider rail 18 such that the mounting bracket 20 can slide up and down along the longitudinal axis of the slider rail 18.

Referring back to FIG. 2B, a channel 46 can be defined between the first portion 26, the second portion 34, and the base 42 of the mounting bracket 20. The channel 46 can define a depth direction D. As represented in FIG. 4 and as will be discussed, the base flange 15 of the window pane 14 can be received within the channel 46 to thereby operatively support and attach the window pane 14 to the mounting bracket 20.

Additionally, the mounting bracket 20 can include a deflectable clip 48 (deflectable member) that is received within an opening (hole) 50 of the window pane 14 (FIG. 4) to further retain the window pane 14 on the mounting bracket 20. As shown in FIGS. 2A-2C, the clip 48 can be included on the first portion 26 of the mounting bracket 20. The clip 48 can resiliently deflect toward and away from the second portion 34 by pivoting at the base 42 of the mounting bracket 20. In its neutral position shown in FIG. 2B, the head of the clip 48 can be disposed within the channel 46. However, during assembly represented in FIG. 4, the base flange 15 of the window pane 14 can be moved downward into the channel 46, and the base flange 15 can resiliently push the clip 48 away from the second portion 34 to allow passage of the window pane 14 into the channel 46. Then, the clip 48 can resiliently flex back toward its neutral position, coming to rest within the opening 50 of the window pane 14, and retaining the window pane 14 in its attached position on the mounting bracket 20.

Referring now to FIGS. 2A-3C, the guide cover 22 will be discussed in detail. Although only one guide cover 22 is illustrated, it will be appreciated that each of the guide covers 22 of the vehicle door 10 can be substantially similar. As will be discussed, the guide cover 22 can help guide attachment of the window pane 14 to the mounting bracket 20 during assembly of the vehicle door 10.

The guide cover 22 can be a monolithic, integrally connected part. The guide cover 22 can also be made out of any suitable material, such as a polymeric material. The guide cover 22 can be manufactured in any suitable fashion. For instance, the guide cover 22 can be molded in some embodiments.

Figure 3A:
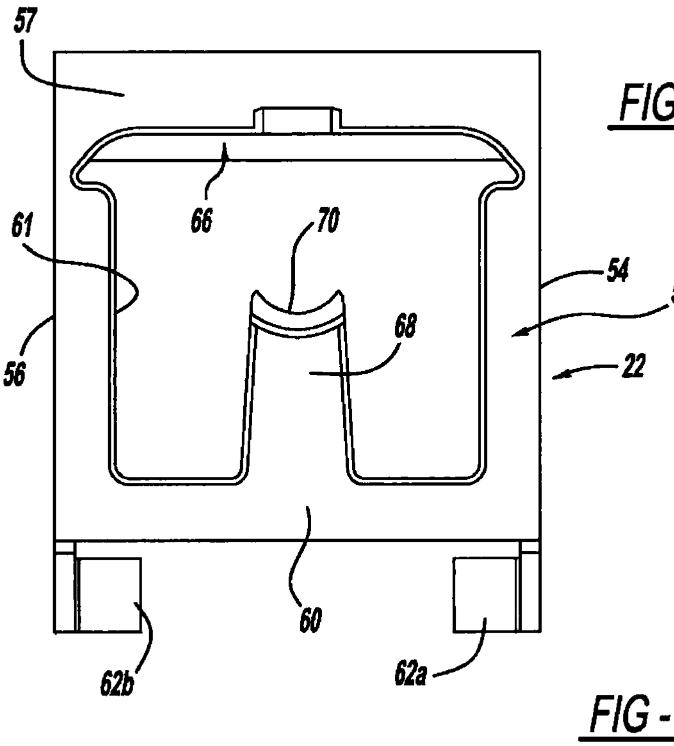
FIGS. 3A, 3B, and 3C are inboard, side, and outboard views, respectively, of the guide cover according to exemplary embodiments of the present disclosure.
Figure 3B:
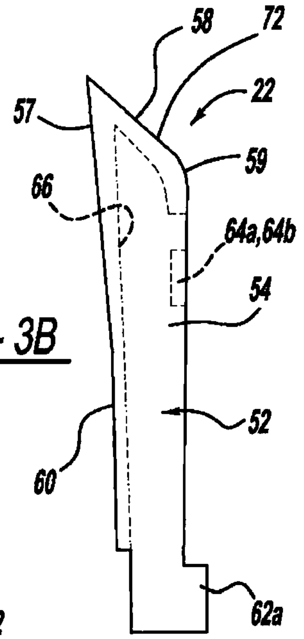
Figure 3C:
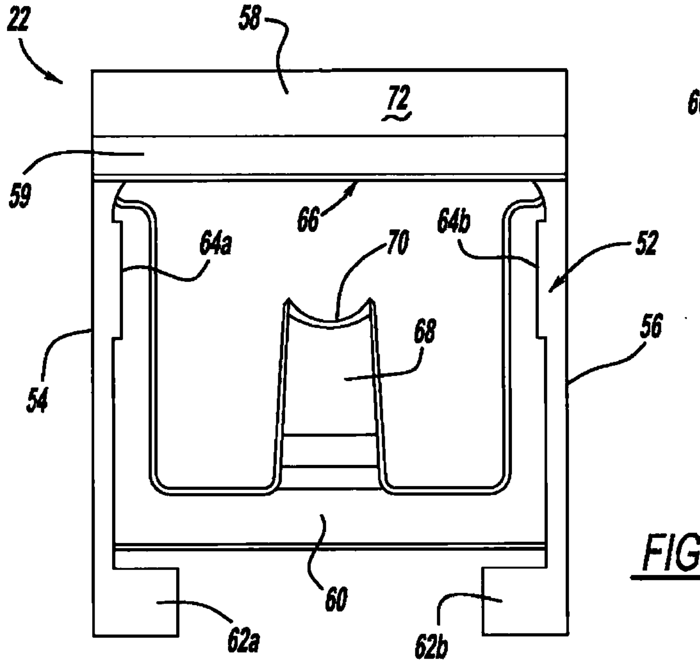

As shown in FIGS. 3A-3C, the guide cover 22 can include a body 52 having a first side wall 54, a second side wall 56, a top covering wall 58, and an exterior wall 60. The first and second side walls 54, 56 can be relatively thin and elongate. The side walls 54, 56 can be substantially similarly shaped and separated at a distance. The exterior wall 60 can extend between the first and second side walls 54, 56 to define an exterior side 57 of the cover 22, and an M-shaped opening 61 (FIG. 3A) can be defined through the exterior wall 60. The top covering wall 58 can extend laterally and can be connected to the top ends of the first and second walls 54, 56 to partially define an interior side 59 of the cover 22. The top covering wall 58 can also define a guide surface 72 along the interior side 59 of the cover 22. The guide surface 72 can be disposed at an angle $\theta_2$ (FIG. 2B) as will be discussed.

The cover 22 can additionally include a plurality of (e.g., two) tabs 62*a*, 62*b* that are relatively flat and rectangular. The tabs 62*a*, 62*b* can be attached to and can extend inwardly from the first and second side walls 54, 56, respectively, on the interior side 59 of the cover 22. Also, the cover 22 can include a plurality of (e.g., two) flanges 64*a*, 64*b* that are relatively flat and elongate. The flanges 64*a*, 64*b* can be attached to and can extend inwardly from the first and second side walls 54, 56, respectively, on the interior side 59 of the cover 22. Moreover, the cover 22 can include a resiliently deflectable member 68 (FIGS. 3A and 3C). As shown, the deflectable member 68 can be defined on a central portion of the exterior wall 60. The deflectable member 68 can include a rounded recess 70 on its terminal end.

As shown in FIGS. 2B and 3B, the body 52 of the cover 22 can define a pocket 66 therein. Specifically, the pocket 66 can be defined between the side walls 54, 56, the exterior wall 60, and the top covering wall 58. The pocket 66 can be sized and shaped according to the exterior surfaces of the mounting bracket 20 such that the pocket 66 can removably receive the first portion 26 of the mounting bracket 20 (FIG. 2B). In this attached position (FIG. 4), the body 52 of the cover 22 abuts and partially covers the first portion 26 of the mounting bracket 20.

Specifically, when the cover 22 is attached to the mounting bracket 20, the first portion 26 can be clamped and compressed between the tabs 62*a*, 62*b*, flanges 64*a*, 64*b*, and top covering wall 58 and the exterior wall 60. Specifically, the inner surface 31 of the first portion 26 can abut against the tabs 62*a*, 62*b*, the flanges 64*a*, 64*b*, and top covering wall 58, and the outer surface 33 can abut against the exterior wall 60 to clamp the first portion 26 of the mounting bracket 20. The first portion 26 can also be clamped and compressed laterally between the first and second side walls 54, 56. Friction and/or interference between the cover 22 and the mounting bracket 20 can further secure the cover 22 on the mounting bracket 20. As such, the cover 22 can be fixed in one position relative to the mounting bracket 20.

During assembly, the body 52 of the cover 22 can slideably and removably attach to the first portion 26 of the mounting bracket 20. Also, the body 52 can snap-fit attach to the first portion 26 of the mounting bracket 20 such that no other tools or fasteners are necessary for attachment. Specifically, as shown in FIG. 2B, the cover 22 can be positioned above the first portion and moved toward the first portion 26. Once the first portion 26 begins to move into the pocket 66, the tabs 62*a*, 62*b*, the flanges 64*a*, 64*b*, walls 54, 56, 60 or other portions of the cover 22 can resiliently deflect slightly to allow the cover 22 to slide and advance over the first portion 26. Also, while the cover 22 advances over the first portion 26, an exteriorly projecting portion of the clip 48 of the first portion 26 can push and resiliently deflect the deflectable member 68 of the cover 22 until the deflectable member 68 has bypassed the clip 48. Once the clip 48 has been bypassed, the deflectable member 68 can resiliently recover and move back toward the interior side 59 with the exterior portion of the clip 48 coming to rest in the recess 70 (FIGS. 2A and 2C). Thus, interference between the clip 48 and the deflectable member 68 can further limit movement of the cover 22 off of the mounting bracket 20.

Accordingly, as shown in FIG. 4, the cover 22 and the second portion 34 of the mounting bracket 20 can cooperate to define the channel 46, and the flange 15 of the window pane 14 can be received within the channel 46. Also, the guide surface 72 of the cover 22 can enlarge the opening 74 into the channel 46 and can help guide the flange 15 through the opening 74 into the channel 46.

Specifically, as shown in FIG. 2B, the guide surface 72 is disposed at an acute angle $\theta_2$ relative to a depth direction D of the channel 46. In comparison, the end surface 32 of the mounting bracket 20 is disposed at a fixed, acute angle $\theta_1$ relative to the depth direction D. The angle $\theta_2$ is larger than the angle $\theta_1$. Also, the guide surface 72 projects upward and away from the end surface 32 of the mounting bracket 20 along the depth direction D. As such, the width $W_2$ of the opening 74 into the channel 46 defined between the terminal end of the guide surface 72 and the first end 36 of the mounting bracket 20 is larger than the width $W_1$ between the end surface 32 and first end 36. Thus, the cover 22 significantly increases the size of the opening 74 into the channel 46. As such, when the window pane 14 is lowered towards the channel 46 during assembly, the opening 74 can be much larger and the flange 15 is more likely to enter the channel 46. This can be especially helpful considering that the channel 46 can be obstructed by other portions of the vehicle door 10.

Moreover, during assembly, the flange 15 of the window pane 14 can move toward the guide surface 72, and because the guide surface 72 is disposed at an angle $\theta_2$, the flange 15 can abut and slide down the guide surface 72 and enter the channel 46 as represented by arrow P in FIG. 4. As such, the guide surface 72 can guide the flange 15 into the channel 46. Once the window pane 14 is in its attached position with the cover 22 and the mounting bracket 20, the window pane 14 can be moved as a unit by the regulator assembly 16 in the direction A shown in FIG. 1A.

It will be appreciated that, the cover 22 can attach to the mounting bracket 20 in any suitable fashion. For instance, when attached to the mounting bracket 20, the cover 22 can cover only the first portion 26 of the mounting bracket 20 as shown in the embodiments of FIGS. 1-4. However, in other embodiments, the cover 22 can cover the first portion 26 as well as the base 42 and/or the second portion 34 of the mounting bracket 20. Also, the cover 22 can compress or clamp to the mounting bracket 20 using any suitable clamping members (i.e., the tabs 62*a*, 62*b*, flanges 64*a*, 64*b*, top covering wall 58, and/or the exterior wall 60), or the cover 22 can attach to the mounting bracket 20 using fasteners, adhesives, or other suitable means.

Accordingly, the cover 22 can significantly facilitate attachment of the window pane 14 to the regulator assembly 16. As such, the window pane 14 can be attached more quickly and easily and with less likelihood of damaging components of the vehicle door 10.

What is claimed is:

1. A guide cover that guides attachment of a window pane to a mounting bracket of a regulator assembly of a door assembly, the mounting bracket including a first portion and a second portion, a channel defined between the first and second portions, the guide cover comprising:

a body operable to removably attach to the first portion of the mounting bracket to position the body in an attached position relative to the mounting bracket, the body, the mounting bracket, and the window pane operable to be moved as a unit by the regulator assembly with the body in the attached position; and a guide surface included on the body, the guide surface and the second portion of the mounting bracket defining an opening into the channel when the body is in the attached position, the guide surface operable to guide the window pane through the opening into the channel, wherein the body includes a first side wall, a second side wall, a top covering wall, and an exterior wall that cooperate to define a pocket that receives the first portion of the mounting bracket therein, the exterior wall including a resiliently deflectable member that resiliently deflects to allow the guide cover to advance over and to removably attach to a projection of the first portion of the mounting bracket that extends across a width of the channel; and the resiliently deflectable member includes a recess that receives the projection of the first portion of the mounting bracket to retain the body in the attached position relative to the mounting bracket.

2. The guide cover of claim 1, wherein the channel defines a depth direction, and wherein the guide surface is disposed at a first acute angle relative to the depth direction.

3. The guide cover of claim 2, wherein the first portion of the mounting bracket includes an end surface that is disposed at second acute angle relative to the depth direction, and wherein the first acute angle is greater than the second acute angle.

4. The guide cover of claim 2, wherein the first acute angle is substantially fixed relative to the depth direction and relative to the body when the body is in the attached position.

5. The guide cover of claim 1, wherein the channel defines a depth direction, and wherein the first portion of the mounting bracket includes an end surface, the guide surface projecting away from the end surface along the depth direction.

6. The guide cover of claim 1, wherein the body includes a first clamping member and a second clamping member, the first and second clamping members cooperating to clamp the first portion of the mounting bracket therebetween.

7. The guide cover of claim 6, wherein the first portion of the mounting bracket includes an inner surface that faces the channel and an outer surface that faces away from the channel, the first clamping member abutting against the inner surface and the second clamping member abutting against the outer surface to clamp the first portion of the mounting bracket.

8. The guide cover of claim 1, wherein the body slideably attaches to the first portion of the mounting bracket to removably attach to the first portion of the mounting bracket.

9. The guide cover of claim 1, wherein the body snap-fit attaches to the first portion of the mounting bracket.

10. The guide cover of claim 1, wherein the pocket receives the first portion of the mounting bracket such that the body abuts and partially covers the first portion.

11. The guide cover of claim 1, wherein the body attaches directly to the first portion of the mounting bracket only.

* * * * *